June 17, 1930.   L. H. DUERR   1,764,436
TANK VALVE CONTROL MECHANISM
Filed Sept. 18, 1928   5 Sheets-Sheet 2
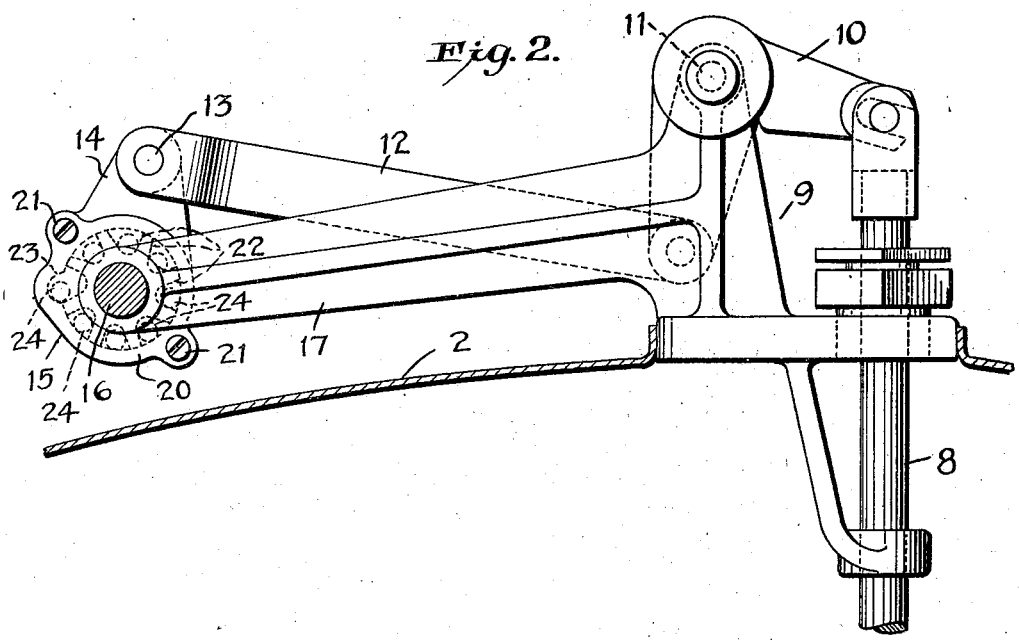
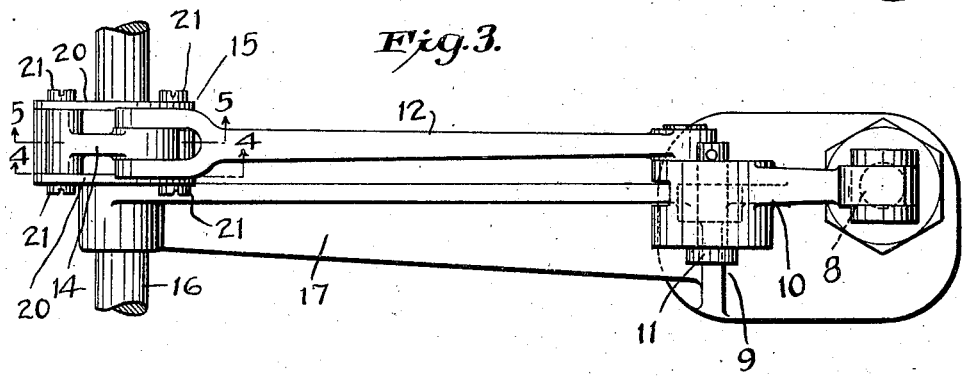
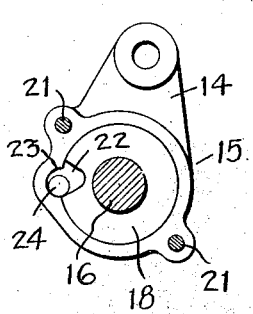
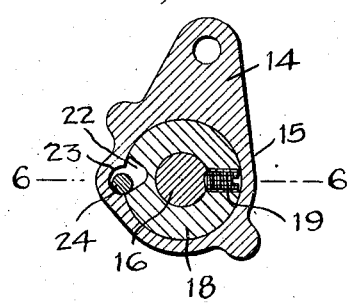
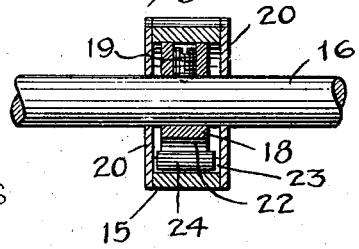
INVENTOR
Leonard H. Duerr
BY
ATTORNEY June 17, 1930.　　　　L. H. DUERR　　　　1,764,436
TANK VALVE CONTROL MECHANISM
Filed Sept. 18, 1928　　　5 Sheets-Sheet 3
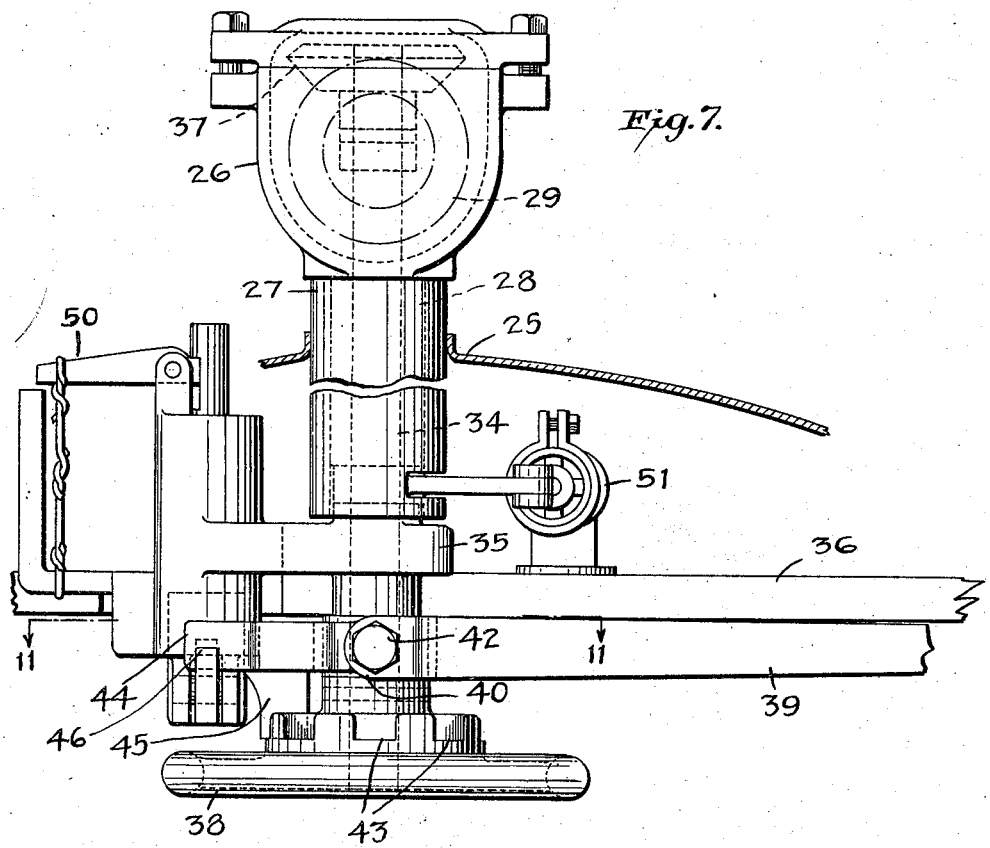
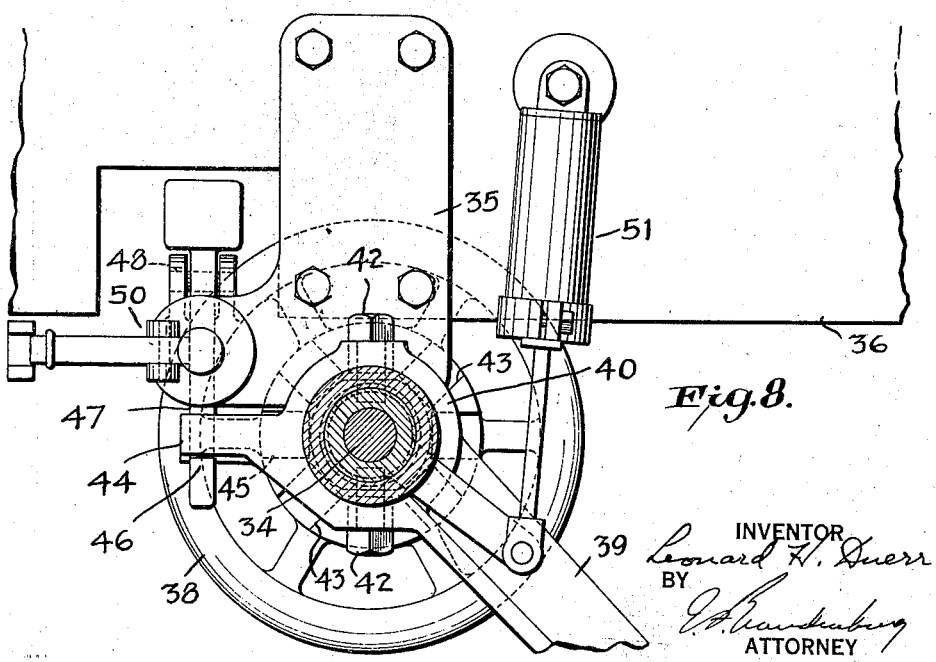
INVENTOR
Leonard H. Duerr
BY
ATTORNEY

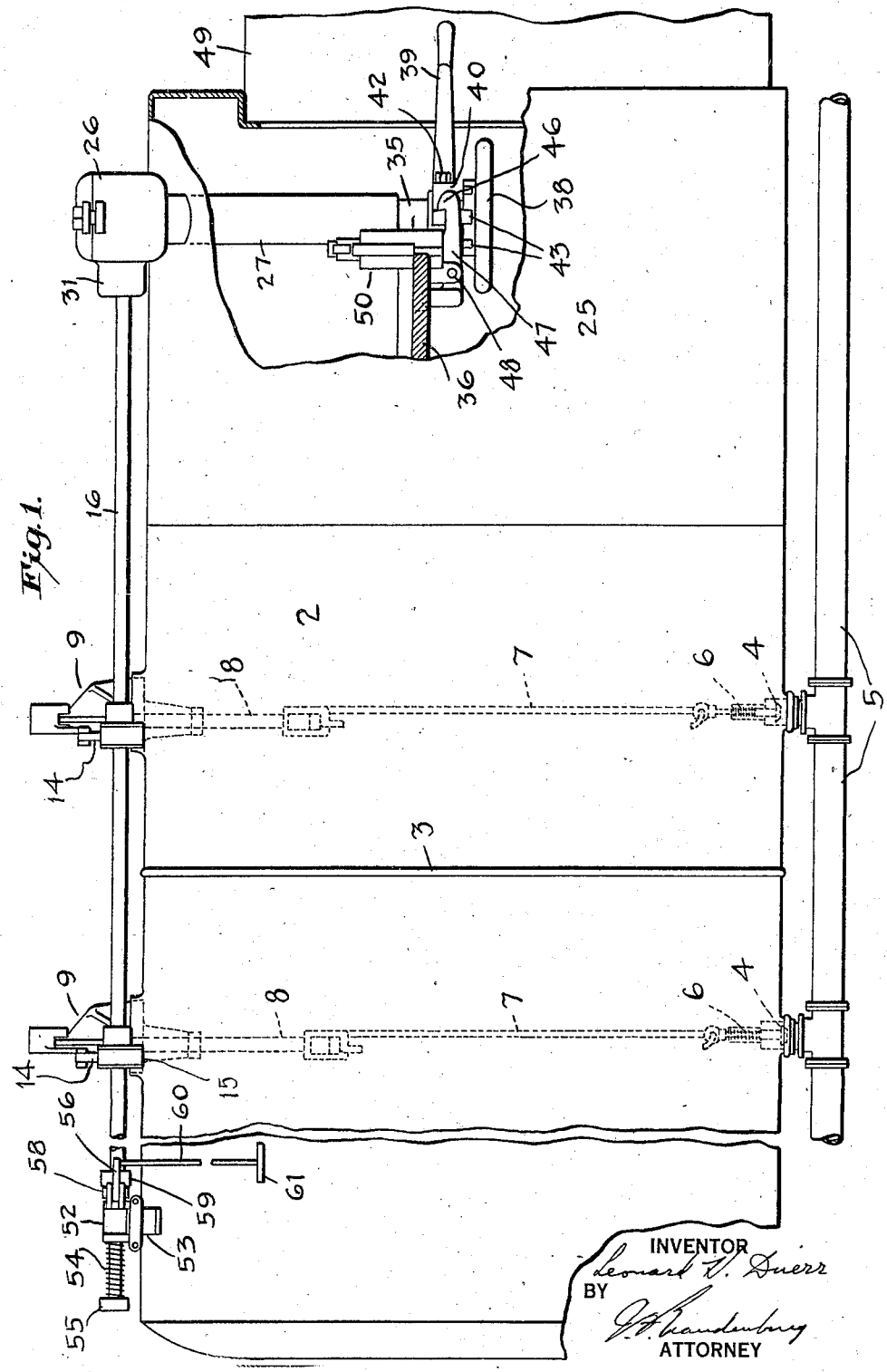

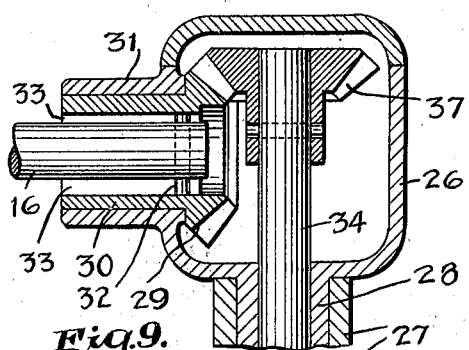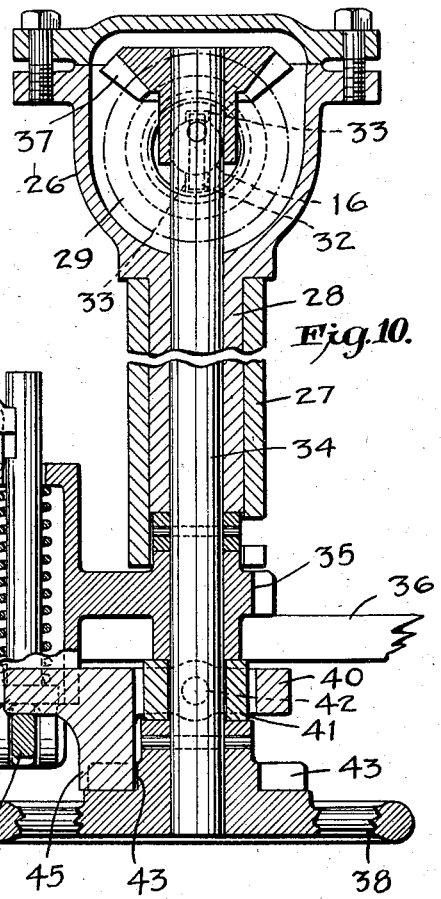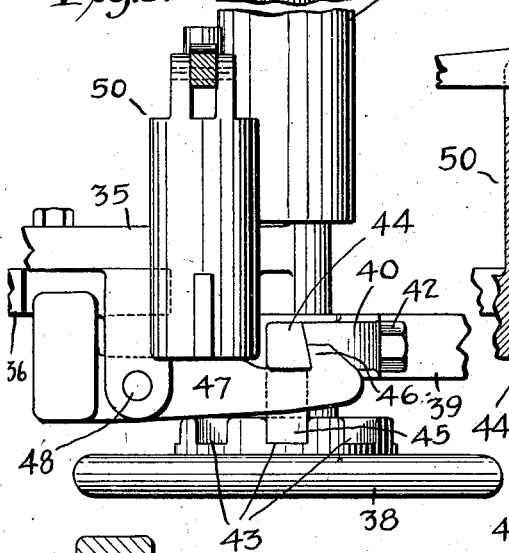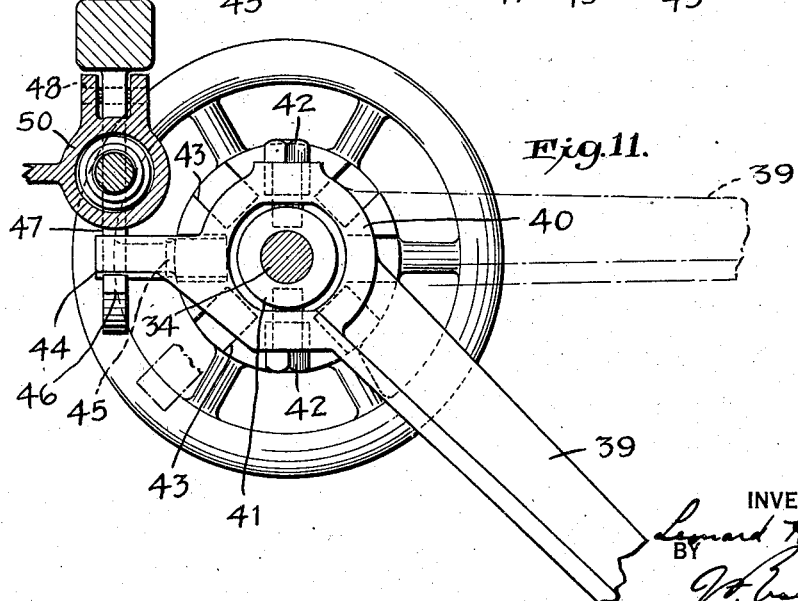

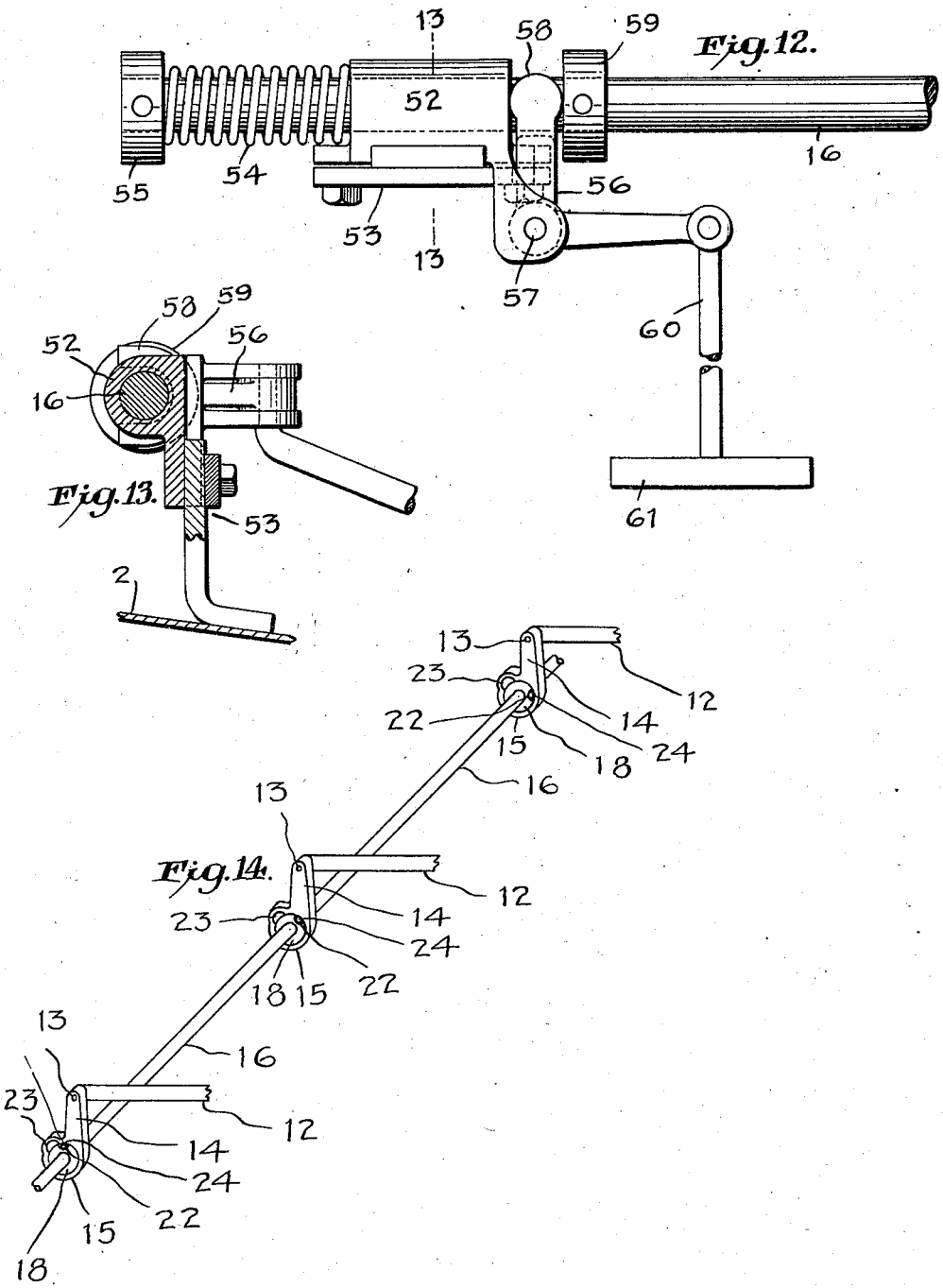

Patented June 17, 1930

1,764,436

UNITED STATES PATENT OFFICE

LEONARD HOWARD DUERR, OF CINCINNATI, OHIO, ASSIGNOR TO AUGUSTINE DAVIS, JR., OF CINCINNATI, OHIO

TANK-VALVE-CONTROL MECHANISM

Application filed September 18, 1928. Serial No. 306,713.

The object of the invention is to provide a simple, durable, reliable and conveniently operable mechanism for operating a plurality of valves in a desired manner. The invention is particularly applicable to the control of normally closed valves commanding the outlets or outlet passages of the compartments or chambers of a multi-compartment truck tank. An object of the invention is to provide an improved control mechanism for operating any one of a plurality of valves selectively. The mechanism involves the novel plan of a common turnable control rod or shaft, and devices associated with the shaft and with the valve connections in such manner that by turning the shaft in one direction selection is effected, whereupon by turning the shaft in the reverse direction the desired valve is opened.

Various other features of the invention will become apparent.

In the accompanying drawings, forming part hereof:

Figure 1 is a side elevation of a multiple compartment truck tank embodying the invention, a large part of the tank intermediate the ends being broken out and a forward lower portion being broken away, a part of the wall of the control box being broken out to show parts within, the door of this box being open and largely broken away, and the valve control mechanism being shown in operated condition, with one of the valves open;

Fig. 2 is a cross-sectional elevation on a larger scale, showing the top of the tank compartment in section and parts related to one of the valve rods in rear elevation, the parts being in positions corresponding to the closed condition of that valve;

Fig. 3 is a plan view of Fig. 2;

Fig. 4 is a section taken on the line 4—4 of Fig. 3;

Fig. 5 is a section taken on the line 5—5 of Fig. 3;

Fig. 6 is a section taken on the line 6—6 of Fig. 5, with a portion of the control shaft in elevation;

Fig. 7 is a sectional elevation, showing the top of the control box in section and the parts in and above this box in elevation, an intermediate portion of the vertical shaft and its bearing being broken out, the parts being in the operated condition, that is to say, with a valve open;

Fig. 8 is a sectional plan view of the parts shown in Fig. 7, the horizontal plane of the section being below the top of the control box;

Fig. 9 is a view partly in side elevation and partly in section of the parts in and above the control box, an intermediate portion being broken out as in Fig. 7, the upper part of the view being in central vertical section and the lower part principally in elevation;

Fig. 10 is a central vertical section taken at right angles to Fig. 9, looking from the rear of the tank;

Fig. 11 is a horizontal section taken on the line 11—11 of Fig. 7;

Fig. 12 is a plan view of parts at the forward part of the control shaft;

Fig. 13 is a vertical cross-section taken on the line 13—13 of Fig. 12; and

Fig. 14 is a schematic perspective view of a portion of the longitudinal control shaft and some of the selective control.

Figure 1 illustrates portions of a multiple compartment truck tank 2, the interior of which is divided by partitions 3, the position of one of which is indicated, into separate compartments. Truck tank bodies are also known in which a series of unit chambers or tanks are secured in a row on mounting. There may be any number of compartments or tank chambers, the mechanism as illustrated being designed for an eight-compartment tank.

Outflow of liquid from the several compartments is normally prevented by valves 4, one for each compartment. The location of these valves may be varied. In a "gravity" tank such as illustrated they command bottom outlets, from which a pipe or pipes 5 extend rearwardly to a faucet or faucets, or other delivery valve means. In a siphon tank the valves may be in the siphons or siphon branches pertaining to the respective compartments. The valves are self-closing, preferably under action of springs 6. The rear valve in Fig. 1 is open, and the valve of the compartment next in front is closed, and it may be understood that the valves of all other compartments are closed.

In the gravity tank illustrated, the valve stems are shown connected by suitable connectors 7 with valve rods 8, which pass through stuffing boxes in the tops of the compartments.

A bracket 9 is secured to or in the top wall of each compartment, and the base of this bracket may carry the stuffing box. A bell-crank lever 10 is pivoted at 11 on each of these brackets, an approximately horizontal arm of the bell-crank being operatively connected with the upper end of the valve rod, and the approximately vertical arm being operatively connected with a link 12, which link extends in a direction transverse of the tank. The other end of this link is operatively connected, preferably by a pivot 13, with an arm 14 on a member 15.

The members 15 are disposed at intervals along a horizontal control rod 16, which is turnable in opposite directions about its axis, this rod or shaft extending longitudinally over the tops of the compartments, fore and aft of the vehicle. The members 15 preferably encircle the shaft 16 and are supported by it, the shaft being capable of turning within the members. The control shaft is mounted to turn in bearings in arms 17 projecting laterally from the brackets 9.

The parts of the shaft 16 which are encircled by the members 15 are preferably larger in diameter than the shaft itself. They might be integral parts of the shaft, as far as selective control is concerned, but it is much more advantageous to make them of separate pieces. Each of these parts is accordingly made as a disc 18 having a central hole by means of which it can be passed over the shaft to be set rigidly thereon by a set-screw 19.

Each of the members 15 may consist of a hub, designated by the same numeral, the interior of which hub fits the periphery of the disc 18, so that these parts can turn relatively to each other, and a pair of face plates 20, disposed at opposite sides of the disc and detachably secured to the hub by screws 21.

Each disc 18 is formed at one region of its surface with an eccentrically located recess 22, the recess being preferably in the peripheral surface. Each of the members 15 is likewise formed with an internal recess 23, the two recesses being adapted to be brought into communication at a certain position of turning of the shaft 16. A pin, roller or other suitable element 24 lies loosely in each recess 22, so as to be carried around by the disc 18. When the recess 22 comes into communication with the recess 23, the roller 24 drops into the recess 23, so that it is partly within this recess and partly within the recess of the disc 18, the recess 23 being of less depth than the diameter of the roller.

The recesses are of such form that when the shaft 16 is turned in a counter-clockwise direction in Figs. 2, 4 and 5, the rollers 24 of the several devices will not form a connection between the parts 18 and 15 in respect to this direction of rotation. In these views one of the elements 24 is in position to form a connection if the shaft is turned in a clockwise direction, but if the shaft is turned in a counter-clockwise direction from the position shown, the roller will simply retreat from the recess 23 into the recess 22 as the latter recess moves downward. If the disc 18 is turned in the clockwise direction from the position of Figs. 2, 4 and 5, the roller 24 will be caught between the surfaces and act as a connection, causing the member 15 to be turned by and with the disc 18.

Each one of the devices comprising the parts which have just been described may be considered as a one-way-acting clutch. While this form of device is highly desirable, I do not limit myself to the particular form or type of construction. What is broadly contemplated is a set of operative connections between the shaft 16 and the valves, or members related to the valves, which connections are operative in respect to one direction of turning movement of the common control shaft, and are adapted to pass idly in the other direction of turning movement. It is further necessary that each of these one-way-acting connections be capable of being brought into operative relation at one point only in a revolution, or partial revolution, of the shaft.

Selectivity is obtained by setting elements of the several devices in different angular relation to the axis of rotation.

Thus, in the particular construction illustrated the discs 18 are fixed to the shaft 16 by the screws 19 in such positions that the recesses 22 of the several discs are all out of line with each other, whereas the recesses 23 of the members 15 are all normally in line with each other. For example, in the case of an eight-compartment tank, the recessed portions of the several discs 18 are at 45° positions about the axis with respect to each other.

However, by adopting a somewhat different form of one-way-acting connection, the elements on the shaft might be in longitudinal line with each other and the cooperative elements on the members related to the valves might be out of line, in different angular positions about the axis, a reversal which would give the same effect.

At the rear end of the tank there is usually a box 25, known as a bucket-box, or as a control box when it houses or has to do with control mechanism.

The shaft 16 extends rearward over the top of this box, and its rear end enters a gear-housing 26 which is supported on the upper end of a tube 27, this tube extending through an opening in the top of the tank, where it is welded or otherwise secured. The gear casing preferably has a downwardly extending bearing extension 28 lying within the tube.

A bevel gear 29 has a hub 30 encircling the end portion of the shaft 16 and free to turn in a bearing 31 of the gear housing. The shaft has a feathered connection with this gear for a reason which will be explained further on, the connection preferably consisting of a pin 32 fixed in a transverse hole in the shaft with its ends projecting, and longitudinal slots 33 in the interior of the hub.

A vertical operating shaft 34 passes downward through the bearing 28 and through a bearing in a bracket 35 which is fixed to a shaft 36 inside the control box.

A bevel gear 37 on the upper end of this shaft meshes with the bevel gear 29. On or connected with the lower portion of the same shaft is a selecting handle, preferably in the form of a horizontal hand wheel 38 pinned to the lower end of the shaft.

An operating lever, for effecting the opening of a valve or valves, is marked 39. This lever is preferably a hand lever, mounted to swing about the axis of the shaft 34. In the preferred construction it has a hub portion 40 containing a large opening, the bounding wall of which is free from a collar 41, to which the hub is connected by pivot pins 42 enabling this lever to be tilted up or down. The collar 41 encircles the shaft 34 as a bearing for the lever, and is confined between the wheel 38 and the bracket 35, the collar 41 and the shaft being free to permit the shaft to turn relatively to the collar.

A part connected with the shaft 34, in this instance the wheel 38, is adapted to be engaged and operated by the lever, or by a part operated thereby, whatever the position to which the shaft may have been turned in the selecting operation. The precise arrangement may be considerably varied. As illustrated, the central part of the wheel has a circularly arranged series of recesses or teeth 43, and a tail 44 on the operating lever has a downward projection 45 adapted to engage any one of the recesses when the body of the handle is tilted upward. The weight of the handle is such that the projection 45 is normally clear of the recesses.

In order to open a selected valve the handle 39 is swung about the axis of the shaft 34 until the tail 44 catches behind the shoulder 46 of the counterweighted latch 47, which is pivoted at 48 on the bracket 35. The pressure of the valve spring transmitted through the mechanism will hold the tail of the lever against the shoulder with sufficient friction to prevent the lever tilting out of engagement with the latch, in addition to which the contacting surfaces may be inclined as shown.

It has been known to arrange the operating lever of tank valve control mechanisms in such a way that when a valve or valves are open the lever interferes with the closing of the door 49 of the box, as shown for example the Davis and Betts Patent 1,562,300, and the same arrangement is illustrated in the present mechanism.

It has been well known to provide a fusible or thermal release for releasing the mechanism to cause the valve or valves to close in event of fire. A fusible release device 50 like that of the Emmich Patent 1,467,717 is shown mounted on the bracket 35 in position to act on the latch 47.

A fluid check 51 such as shown in the Betts Patent 1,552,030 may be connected with the shaft 34.

It is also well known, as shown in the Betts Patent 1,552,030 and the Fuller and Betts Patent 1,566,472, to provide a so-called cab-release, that is to say means operable at the forward end of the tank for releasing the valve mechanism, if it should become necessary.

The cab-release employed in connection with the present mechanism is generally similar to that of the Fuller and Betts patent, but exhibits certain differences.

The forward part of the shaft 16 passes through a bearing 52 on a bracket 53, and a spring 54 interposed between this bearing and a collar 55 on the front end of the shaft keeps the shaft from moving longitudinally under ordinary conditions. A bell-crank 56 pivoted at 57 on this bracket has a fork 58 interposed between the bracket and another collar 59 on the shaft. A rod 60 or other suitable connection is connected with the bell-crank and provided with a handle 61, enabling the shaft to be shifted rearward slightly against the tension of the spring 54. This movement will carry the pin 32 in the rear end of the shaft out of engagement with the grooves 32 in the hub of the gear 30, disconnecting the connection at this region and permitting the open valve or valves to close.

The two grooves 33 are made of unequal depth, and the projecting ends of the pin 32 are of unequal length, so that the connection can be reconnected in only one position with respect to relative turning between the shaft and the gear.

To operate the mechanism as a selective control, the wheel 38 is turned in one direction to the position which will bring one of the rollers 24 into position to act as an operating connection between the shaft 16 and the valve of the desired compartment. In this operation none of the valves are actuated. The rim of the wheel may be provided with numerals to assist the operator in turning it to the proper position. Then the operator grasps the handle of the lever 39, tilts it upward a little so as to cause the projection 45 to engage one of the recesses 43 in the wheel, and pulls the handle outwardly from the box until the tail of the lever is caught and held by the latch 47. This turns the shafts 34 and 16 in the reverse direction, and through the parts 18, 24 and 15 which were brought into operative relation, opens the selected valve.

It will be apparent that the form of the mechanism and its parts may be varied to a considerable extent without departing from the scope of the invention defined in the claims.

What is claimed as new is:

1. A valve mechanism for controlling a plurality of valves, comprising a common control shaft turnable in opposite directions, manual means for operating said shaft, members related to the several valves, and instrumentalities on said shaft adapted by turning movement of the shaft in one direction to be placed in operative relation to said members and then by turning movement in the reverse direction to operate the member or members selectively.

2. A valve mechanism for controlling a plurality of valves, comprising a common control shaft turnable in opposite direction, members related to the several valves, and instrumentalities on said shaft adapted by turning movement of the shaft in one direction to be placed one at a time in operative relation to the corresponding one of said members, whereupon turning of the shaft in the reverse direction causes the particular instrumentality to operate its corresponding member.

3. A valve mechanism for controlling a plurality of valves, comprising a common control shaft turnable in opposite directions, members related to the several valves, and devices between said shaft and said members of such nature that by turning the shaft in one direction the valves can be selected for operation, whereupon turning of the shaft in the opposite direction will open the selected valve.

4. A valve mechanism for controlling a plurality of valves, comprising a common control shaft turnable in opposite directions and having recessed parts at intervals along its length, turnable recessed members associated with said parts and related to said members, and one-way-acting clutch elements in one set of recesses adapted to enter the other set of recesses, the members of one set of recesses being in different positions about the axis.

5. A valve mechanism for controlling a plurality of valves, comprising members related to the several valves, a common control shaft turnable in opposite directions, and automatic clutch devices between said shaft and said members of such nature that by turning of the shaft in one direction any of said members may be selected for operation, whereupon turning of the shaft in the opposite direction causes the operation of a selected member.

6. A valve mechanism for controlling a plurality of valves, comprising a common control shaft turnable in opposite directions, manual means for operating said shaft members encircling said shaft and related to the several members, and automatic clutch devices between said shaft and said members of such nature that by turning of the shaft in one direction any of said members may be selected for operation, said clutch devices being one-way acting and adapted to be brought into operative relation at different positions of turning so that turning of the shaft in the opposite direction will cause the operation of a selected member.

7. A valve mechanism for controlling a plurality of valves, comprising a common control shaft turnable in opposite directions, members related to the several valves, devices between said shaft and said members of such nature that by turning the shaft in one direction the valves can be selected for operation by reverse turning movement, mechanism connected with said shaft for turning the same, means co-operative with a part of said mechanism for holding said shaft in position with a valve or valves open, and means operable from a distant point for disconnecting said shaft from said mechanism.

8. A valve mechanism for controlling a plurality of valves, comprising a common control shaft turnable in opposite directions, members related to the several valves, devices between said shaft and said members of such nature that by turning the shaft in one direction the valves can be selected for operation by reverse turning movement, mechanism connected with said shaft for turning the same, means co-operative with a part of said mechanism for holding said shaft in position with a valve or valves open, means related to another part of said shaft for moving the same endwise, and a connection between said shaft and said mechanism adapted to be disconnected by said endwise movement.

9. A valve mechanism for controlling a plurality of valves, comprising a common control shaft turnable in opposite directions, members related to the several valves, devices between said shaft and said members of such nature that by turning the shaft in one direction the valves can be selected for operation by reverse turning movement, mechanism connected with said shaft for turning the same, means co-operative with a part of said mechanism for holding said shaft in position with a valve or valves open, means related to another part of said shaft for moving the same endwise, and a connection between said shaft and said mechanism adapted to be disconnected by said endwise movement, said connection being capable of being re-connected in only one relative position.

10. A valve mechanism for controlling a plurality of valves, comprising a common control shaft turnable in opposite directions, members related to the several valves, devices between said shaft and said members of such nature that by turning the shaft in one direction the valves can be selected for operation by reverse turning movement, an operating shaft at an angle to said control shaft, gearing between said shafts, means for turning said operating shaft for selection, a lever free in relation to said operating shaft, and means whereby said lever can be operatively connected with said operating shaft.

11. A valve mechanism for controlling a plurality of valves, comprising a common control shaft turnable in opposite directions, members related to the several valves, devices between said shaft and said members of such nature that by turning the shaft in one direction the valves can be selected for operation by reverse turning movement, an operating shaft at an angle to said control shaft, gearing between said shafts, a lever free in relation to said operating shaft, means whereby said lever can be operatively connected with said operating shaft, means for holding said operating shaft in position with a valve open, a connection between said control shaft and said gearing, and means for disconnecting said connection by movement of the control shaft effected at a distant point.

12. In a truck tank comprising a plurality of chambers, valves pertaining to the several chambers, operating connections to the several valves, a common control shaft turnable in opposite directions, and devices between said shaft and said valve connections of such nature that by turning the rod in one direction a valve can be selected for operation by reverse turning movement.

LEONARD HOWARD DUERR.